Figure 3:
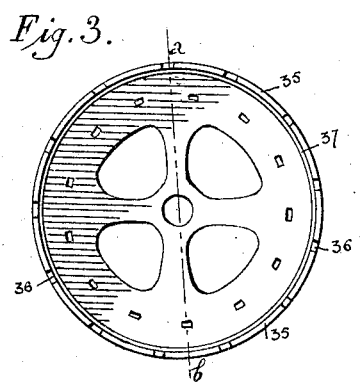

No. 851,297. PATENTED APR. 23, 1907.
A. MARIOLLE.
ADVERTISING NOVELTY.
APPLICATION FILED APR. 6, 1906.
3 SHEETS—SHEET 1.
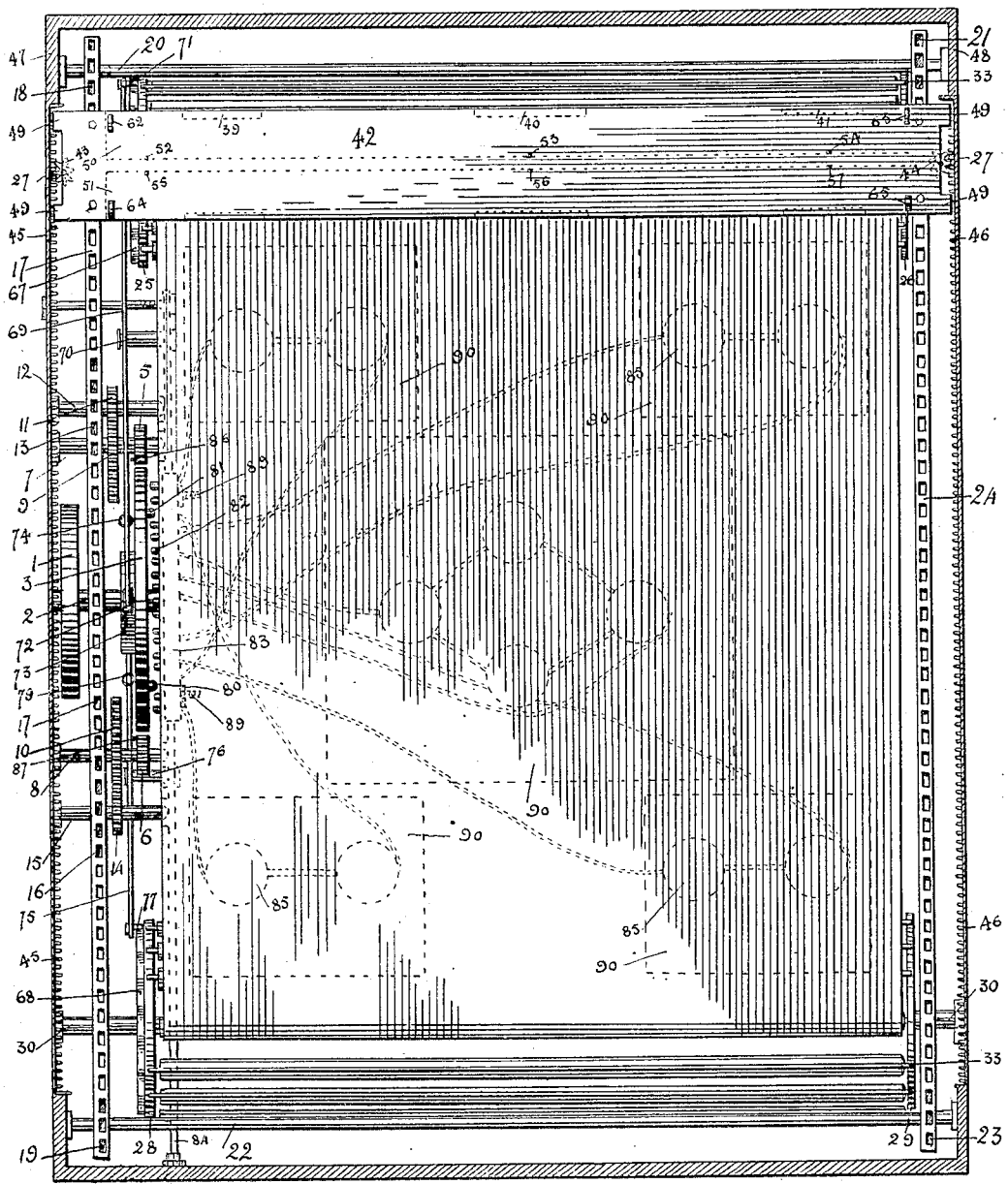
WITNESSES
Fig. I.
INVENTOR No. 851,297. PATENTED APR. 23, 1907.
A. MARIOLLE.
ADVERTISING NOVELTY.
APPLICATION FILED APR. 6, 1906.

3 SHEETS—SHEET 2.

WITNESSES
Arthur J. Rabett
Walter Charless

INVENTOR
Auguste Mariolle

No. 851,297. PATENTED APR. 23, 1907.
A. MARIOLLE.
ADVERTISING NOVELTY.
APPLICATION FILED APR. 6, 1906.
3 SHEETS—SHEET 3.
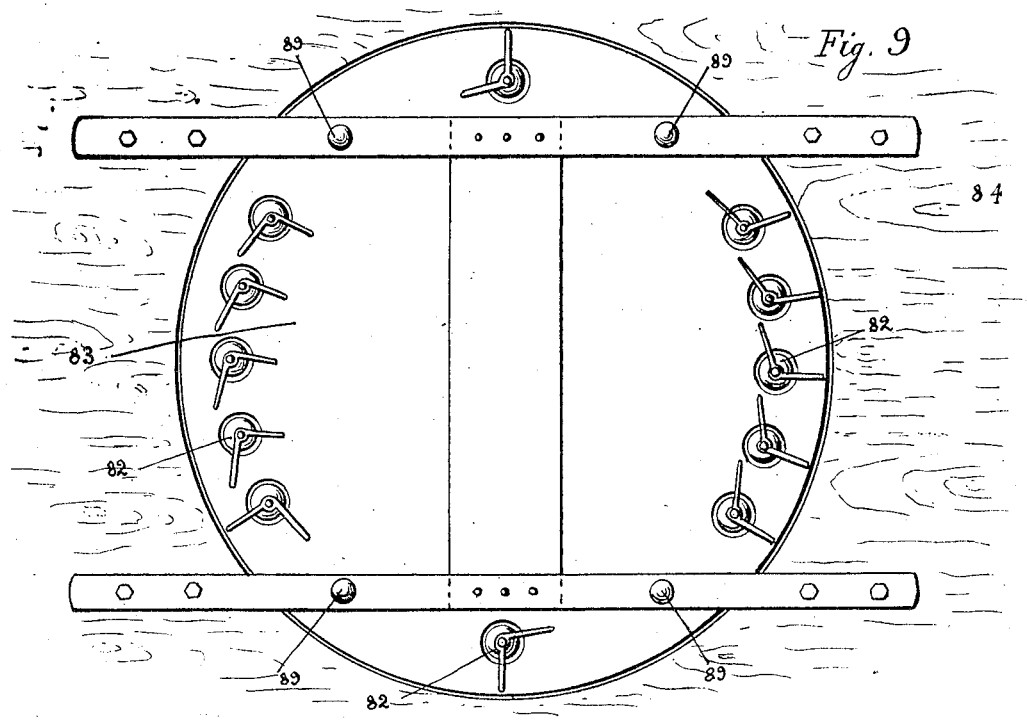
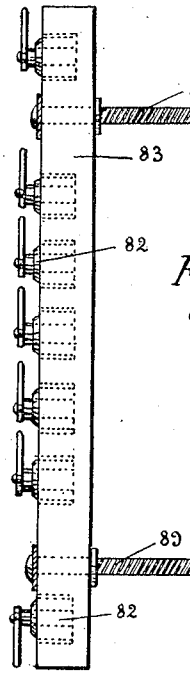

UNITED STATES PATENT OFFICE.

AUGUSTE MARIOLLE, OF NEW YORK, N. Y.

ADVERTISING NOVELTY.

No. 851,297.          Specification of Letters Patent.          Patented April 23, 1907.

Application filed April 6, 1906. Serial No. 310,293.

To all whom it may concern:

Be it known that I, AUGUSTE MARIOLLE, a citizen of the French Republic, and a resident of New York, in the county of New York and State of New York, have invented a new and useful Improvement in Advertising Novelties, of which the following is a specification.

My invention relates to improvements in advertising novelties, and it consists in the new features and combinations of parts hereinafter described and pointed out in the claims.

The object of my invention is to produce a machine for the purpose of advertising or any other displays, having a very attractive appearance at daytime and by transparency, surprising effects at night by means of suitable lights located inside the box containing the mechanism.

A number of suitable rollers, carrying painted canvas and mounted as ordinary window-shades are placed between two wheels at the upper part of a suitable supporting frame. Two other similar wheels are at the lower part of the said frame. The rollers are successively operated and their canvas unrolled with either an up or a down motion by a suitable mechanism taking a picture from the upper wheels, carrying it down, showing that picture for a while; taking another picture from the lower wheels, displaying the latter with an ascending motion when the former displayed goes back around its roller between the upper wheels and so on. The rollers are changed automatically in the upper wheels during the exposure of a painting of the lower wheels and vice-versa. The pictures occupy nearly the whole front of the framing, giving thus a very fine appearance to the machine.

Bulbs placed at the front of the casing light the pictures at night and are controlled by electrical contacts located inside the casing and worked automatically by the mechanism. Other bulbs fixed at the back, inside the casing, project intermittently very strong light upon one or several parts of the curtain. The curtains are painted on the front and also on the back, opposite to the parts of the front where there is no painting. The picture at the front is seen during the day or when the front bulbs are lighted; the pictures at the back appear intermittently at night or in dark places through the strong light of the bulbs with reflectors located inside the casing. Leaving the front bulbs lighted when the inside lights are lighted, very surprising additions to the front picture can be shown. Extinguishing automatically the front bulbs when the inside bulbs are lighted, the back pictures appear alone giving thus two different advertisements for each curtain. With this machine, very strange effects can be given at night.

Figure 6:
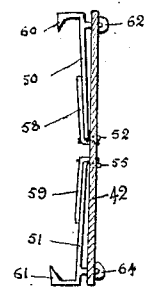
Figure 2:
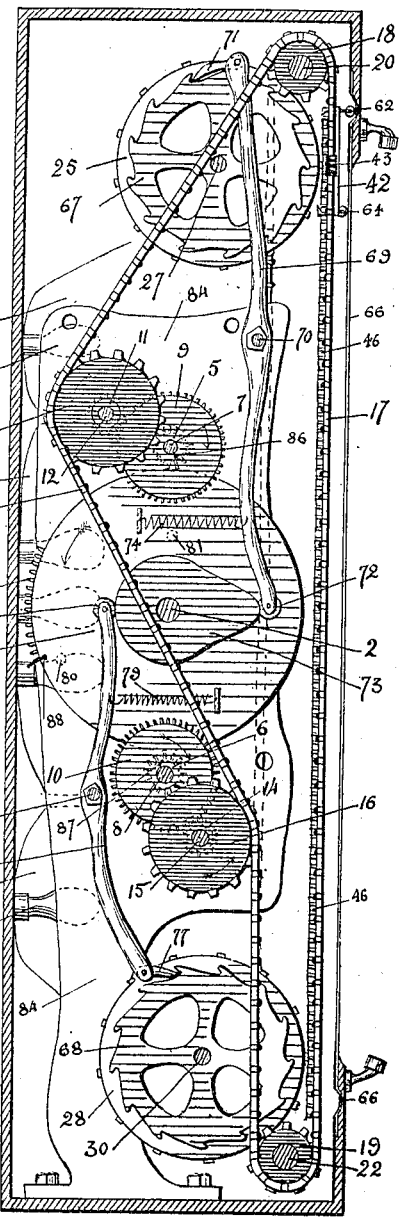
Figure 4:
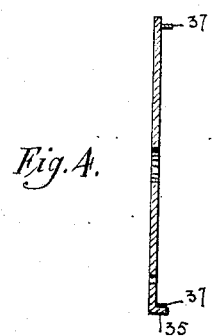
Figure 5:
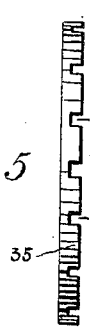
Figure 7:
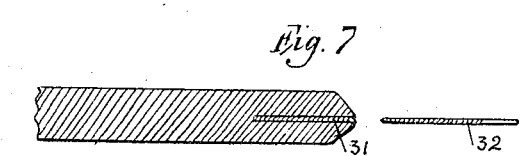
Figure 8:

These objects are attained by the mechanism fully described hereinafter and illustrated in the accompanying drawings, in which:

Figure 1 is a front elevation of the interior of the machine, the front of the enclosing frame removed, a curtain from the lower wheels displayed completely. Fig. 2 is a side elevation of the interior of the machine, a side of the enclosing frame removed, the whole mechanism shown, the curtain in the position shown in Fig. 1. Fig. 3 is a side elevation of one of the wheels supporting the rollers at the upper part of the machine. Fig. 4 is a section of the same wheel on the dotted line $a, b$ of Fig. 3. Fig. 5 is a front elevation of the same wheel. Fig. 6 is an enlarged side elevation of the device operating the curtains of the rollers. Fig. 7 is a longitudinal section of the end of one roller, showing the threaded tube in which the movable threaded shaft is fitted, to support the said roller in position between the wheels. Fig. 8 is a front view of a part of the rod ending each canvas mounted on each roller, Fig. 9 is an enlarged side elevation of the disk supporting the electrical devices, the switches placed according to the position of the intermittent gear in the drawings. Fig. 10 is a front elevation of the said disk.

These machines can be made in several sizes, and according to their dimension may be operated by hand, clock movement or by any suitable electric motor, gas engine etc. In the accompanying drawings a pulley 1, or any suitable gear, mounted on a shaft 2 is intended to receive the motion of any power. The said pulley is shown only in Fig. 1 and not in Fig. 2 to permit a complete view of the operating mechanism. On the same shaft 2, an intermittent gear 3, intended to actuate all parts of the machine, moves according to the speed of the pulley 1. The intermittent gear 3 has a number of teeth 4 corresponding with those of the gears 5 and 6 mounted on shafts 7 and 8 and placed opposite to each other, over and under the intermittent gear 3. On the shaft 7 is mounted another gear 9 and on the shaft 8, a gear 10. The gear 9 works a gear 11 mounted on the shaft 12 and a sprocket 13 is also mounted on the said shaft 12.—The gear 10 works a gear 14 mounted on the shaft 15, and a sprocket 16, similar to the sprocket 13 is mounted on the said shaft 15. According to the ratio of the gears 9 and 11 the sprocket 13 is given a number of rotations and moves the chain 17 running upon it.

The gears 10 and 14 are similar to the gears 9 and 11 and the sprocket 16 similar to the sprocket 13 also actuates the chain 17 running upon it, but said chain is placed on the side of the sprocket 16 opposite to the sprocket 13.—Every time the teeth of the gear 3 operate the gear 5, the said gear 5 having the same number of teeth makes a complete turn and stops; a moment after, the teeth 4 of the intermittent gear 3 operate the gear 6 which makes also a complete turn and stops and so on. The gears 5 and 6 have thus an intermittent motion which is transmitted to the chain 17, as aforesaid, the said chain on account of its position upon the sprockets is moved alternately in opposite directions.

The gears and sprockets, being exactly the same size, the chain is given an upward motion exactly the same length as the downward.—The endless chain 17 is destined to operate the device intended to take the pictures intermittently from the upper and lower wheels maintaining the rollers carrying the curtains, and for that purpose runs on the sprocket 18 placed at the upper part of the casing and on a similar sprocket 19 placed at the lower part. The sprocket 18 is mounted on a shaft 20 crossing the entire machine and bearing at the other end another similar sprocket 21.—The sprocket 19 is mounted on a shaft 22, crossing also the entire machine and bearing at the other end another similar sprocket 23; an endless chain 24 runs on the sprockets 21—23.—

The shafts 20—22 are placed respectively at the same distance from the front side of the casing, both chains 17—24 being thus exactly parallel one with the other at their front parts, make a sort of carriage which can carry any kind of device fastened to both chains and that according to the movement given to the main chain 17.

The rollers carrying the curtains are placed at equal distance apart and fixed between two wheels 25—26 mounted on shaft 27 at the upper part of the casing, the said shaft crossing the entire framing. The same number of rollers are placed between two similar wheels 28—29 mounted on shaft 30 at the lower part of the casing. The rollers are placed in the usual way, as in windows and are similar to those actually in the market; the rectangular shaft is placed in a rectangular slot reserved in one of the wheels, the round shaft placed in the round hole on the opposite wheel, but this round shaft is movable, as shown Fig. 7; a threaded pipe 31 is fitted in the wood of the roller and the shaft 32 is also threaded to be screwed into the pipe 31. The placing of the rollers between the wheels is as follows: The roller with its canvas tight around it is presented between the wheels 25—26, the rectangular shaft placed in one of the rectangular slots of the wheel 25 and the round shaft 32 held in the hand.

To assure the good operation of the curtain several turns are given to the roller, the spring of which is thus wound up a little. The rod 33 is then sewed at the outer end of the canvas and the round shaft 32 fitted into the pipe 31 through the opposite round hole of the wheel 26. The roller is then in position and both rectangular ends 34 of the rod 33, Fig. 8, being upon the special parts 35 of the wheels 25—26, the spring of the roller cannot work back the turns given as aforesaid and the curtain is maintained tight around the roller. The said wheels can be made in wood or any other material. The part 35 has the form of a flat ring fixed on the inside face of each wheel for the purpose of supporting the rods of the rollers. To permit the placing of the rollers between the wheels, apertures 36 are reserved in the ring 35. A flat spring 37, shown Fig. 3 and 4 is fitted in the inside of the ring, the spring by its tendency to free itself closes all apertures, thus preventing displacement of the rods. The rods 33 are made of any suitable material; they are rectangular to rest firmly upon the wheels and rounded, as in parts 38, shown Fig. 8, and in the places 39—40—41 (Fig. 1) to be caught easily by the operating mechanism. The canvas is firmly sewed around the rod 33 except in the parts 39—40—41 where the convas is cut to enable the hooks of the catching device to take the rod easily.

The catching device is composed of a strip 42 made of aluminium or any suitable material, crossing the entire machine and firmly fastened to the chains 17 and 24. Small gears 43—44 at each end of the strip 42 run upon toothed tracks 45—46 fixed to the walls 47—48 of the framing and the parts 49 of said strip 42 slide along the toothed tracks 45—46.

Two special hook-shaped strips 50—51 shown Fig. 1—2 and 6 are loosely fastened to the strip 42, as shown Fig. 6 at points 52—53—54 for the strip 50 and 55—56—57 for the strip 51; flat springs 58—59 maintain the said strips 50—51 along the strip 42 but the hook-shaped parts 60—61 of the strips 50—51 are directed by two wheels 62—63 for the strip 50, wheels 64—65 for the strip 51, as shown Fig. 1 and 6. Each of the said wheels is mounted on one end of rods or strips firmly fixed at right angles by their other end to the strips 50, 51 and passing loosely through apertures formed in the strip 42. The rods or strips are all of the same dimension. The said wheels run upon tracks 66, shown Fig. 2, reserved in the front of the framing, and according to the form of the said tracks the springs 58—59 are either worked upon, and the hook shaped parts come nearer to the rods of the canvas, or the springs 58—59 being not operated, the hook-shaped parts resting on the strip 42 give a clear passage to the rods of the rollers when the said rollers are changed according to the motion given to the wheels supporting them by a suitable mechanism which is described hereinafter.

The strip 42, with the described construction, has a very steady operation and draws the curtains gently either from the top wheels or the bottom wheels according to the motion of the chains 17—24 to which the said strip is fastened, as previously described.

The change of every curtain coming back in its resting position after its exposure is accomplished automatically when the strip 42 is at rest either at the upper or at the lower parts of the framing, and for that purpose a ratchet wheel 67 is mounted on shaft 27 near the wheel 25, and another similar ratchet wheel 68 is mounted on shaft 30 near the wheel 28. A clutch 69 mounted on a pivot 70 works the said ratchet wheel 67 by means of a dog 71, every time the wheel 72 mounted at the other end of the said clutch is operated by a cam 73 mounted on shaft 2. A spring 74 maintains the clutch 69 along the cam 73. Another clutch 75 mounted on a pivot 76 works the ratchet wheel 68 by means of a dog 77, every time the wheel 78 mounted at its other end is operated by the said cam 73. A spring 79 maintains the clutch in position. The dogs 71—77 maintain respectively the wheels 25—28 in position during the tension of the curtains when they are operated.

The intermittent gear 3 has in one face two pins 80—81 destined to work a number of electrical pushes or switches 82, located in their way upon a movable disk 83 mounted on the inside partition 84, which supports the shafts 2—7—8 of the operating mechanism. The pin 80 closes the lighting circuits and the pin 81 breaks the same. A number of groups of bulbs 85 according to the size of the machine are fixed on the back part of the framing and can be lighted all at the same time on each group one after the other according to the number of switches connecting the said bulbs. Very surprising effects can be occasioned at night or in dark places, showing paintings on the back of the canvas, which do not appear at day light. Any kind of suitable pushes or switches can be used in this machine.

The intermittent gear 3, by each turn, shows two curtains; for the purpose of lighting both, a double number of switches are placed on the disk 83, in proper places, and are operated intermittently.

The lights on the outside of the casing are connected with switches on the same disk 83 and are worked by the pins 80—81 when the inside lights are extinguished. They are extinguished before the inside lights are lighted. The outside and inside lights are respectively lighted for the same length of time according to the position of the switches on the disk.

The operation of the machine is as follows: The intermittent gear 3, moved slowly in the direction indicated by the arrow, operates with its teeth 4 the gear 6 which makes an entire turn, at the same time the pin 80, working the switch controlling the front bulbs, lights the said bulbs. The gear 10, mounted on the same shaft as the gear 6 turns also, working the gear 14 and consequently the sprocket 16 and the chain 17. The entire system is actuated at the same time and the strip 42 comes down with a curtain taken from the upper wheels 25—26.—The intermittent gear proceeding in its rotation, the pin 81 operates the switch previously indicated and extinguishes the outside lights, at the same instant, the pin 80 works the switches connecting the inside bulbs and lights the said one after the other, the cam 73 operates the clutch 75 and consequently the ratchet 68, a curtain of the lower wheel is put in the way of the hook shaped device; then the gear 3 operates the switches with its pin 81 and extinguishes the inside lights and its teeth 4 engaging the gears 9 and 11 and the sprocket 13 are operated and the hook shaped device comes back to its upper position, operated by the reciprocation of the chain 17. Another canvas is displayed, taken from the lower wheels and the canvas previously shown is rolled back around its roller and is changed a moment after by the action of the clutch 69 upon the ratchet 67. The lights are again lighted and extinguished and so on.

The cog-wheels 5 and 6 are of the same diameter and have exactly the same number of teeth. When one is moved by the intermittent gear, the other moves at the same time on account of its connection with the same chain 17, and both always making a full turn come back to their respective positions. In case of a vibration or shock to the machine, slightly disturbing the positions of said cog-wheels 5 and 6 a pin 86 is placed on the gear 5 near the tooth first engaged by the intermittent gear; a similar pin 87 is also placed on the gear 6. A finger 88 is fixed on the intermittent gear in the position shown Fig. 2 and, by its action upon either the pin 86 or the pin 87 will place the said gears in proper position to be operated by the intermittent gear 3. It is only a measure of precaution, the gears 5 and 6 being locked respectively by their connection with the same chain 17, cannot move except when the mechanism is at work.

The function of the strip 42 is to operate the canvas of the rollers by means of the hook-shaped parts fastened to the strip and to hide from view the outer ends of the said rollers and the rods. With its toothed wheels running on the tracks 45—46 it has an up and down motion without any shock and this machine can be operated over wagons or automobiles and displayed on any roads or streets as well as in fixed locations.

The clutches and electric contacts being actuated by the cam and the intermittent gear mounted on the main operating shaft have a sure and steady operation without any vibration. This is a very important feature of my invention.

The disk 83, as shown in dotted lines Fig. 1 is fastened to the partition 84 by means of bolts 89—89. During the day time the said bolts are loosened and the disk is taken out of reach of the pins.

The mechanism can be placed at either side of the machine, the partition 84 being movable is easily fixed to either side by strong bolts.

The position of the mechanism permits the display of the picture well in the middle of the front of the casing.

Reflectors 90 made of tin or any suitable material, and having any form according to the light to be projected are placed around the groups of bulbs, as shown Fig. 1 and in section in Fig. 2, each group of bulbs lighting thus only the space wanted in the canvas.

What I claim as my invention and desire to secure by Letters Patent is:

1. A displaying machine comprising a general supporting frame and a movable partition therein; special wheels mounted two by two on shafts at upper and lower parts of said framing; a number of specially shafted spring rollers carrying curtains, and placed in succession between the said wheels, the shafts of said rollers inserted into holes formed in the wheels and the ends of the curtains resting upon the periphery of said wheels; ratchet wheels mounted on the same shafts as the wheels for the intermittent operation thereof, combined with a driving shaft and means by which the said shaft may be driven; a cam mounted on the said driving shaft; a pair of levers operated at one end by the said cam and working intermittently with their other end the ratchet wheels at upper and lower parts of the casing for the change of the spring rollers after each display of their curtains; a hook-shaped device adapted to be moved from the lower wheels to the upper and vice-versa; means or tracks on the side walls of the framing to direct the said device in its travels; means on the said device to run upon the said tracks of the side walls; means at one end of the curtains to be caught by the hook shaped device; means on the said hook-shaped device to catch automatically the end of a curtain from the lower and upper wheels and to release it at the end of each travel, substantially as set forth.

2. A displaying machine comprising a general supporting frame and a movable partition therein; special wheels mounted two by two on shafts at upper and lower parts of said framing; a number of specially shafted spring rollers carrying curtains, and placed in succession between the said wheels, the shafts of said rollers inserted into holes formed in the wheels and the ends of the curtains resting upon the periphery of said wheels; ratchet wheels mounted on the same shafts as the wheels for the intermittent operation thereof; a driving shaft and means by which the said shaft may be driven; a cam mounted on the said driving shaft; a pair of levers operated at one end by the said cam and working intermittently with their other end the ratchet wheels at upper and lower parts of the casing for the change of the spring rollers after each display of their curtains; a hook-shaped device adapted to be moved from the lower wheels to the upper and vice-versa; means or tracks on the side walls of the framing to direct the said device in its travels; means on the said device to run upon the said tracks of the side walls; means at one end of the curtains to be caught by the hook-shaped device; means on the said hook-shaped device to catch automatically the end of a curtain from the lower and upper wheels and to release it at the end of each travel combined with an intermittent gear mounted on the said driving shaft; an operating mechanism composed of two groups of gears and sprockets mounted on shafts located over and under the intermittent gear and receiving intermittent motion from the said gear; endless chains controlling the said hook shaped device, one of the said chains operated intermittently by the operating mechanism in a way to give a reciprocating motion to the hook-shaped device fastened to the said chains; sprockets on which run the said endless chains; said sprockets mounted on shafts at upper and lower parts of the casing, crossing the entire machine, both chains being thus connected and running in unison when one is actuated, substantially as set forth.

3. A displaying machine comprising a general supporting frame and a movable partition therein; special wheels mounted two by two on shafts at upper and lower parts of said framing; a number of specially shafted spring rollers carrying curtains, and placed in succession between the said wheels, the shafts of said rollers inserted into holes formed in the wheels and the ends of the curtains resting upon the periphery of said wheels; ratchet wheels mounted on the same shafts as the wheels for the intermittent operation thereof; a driving shaft and means by which the said shaft may be driven; a cam mounted on the said driving shaft; a pair of levers operated at one end by the said cam and working intermittently with their other end the ratchet wheels at upper and lower parts of the casing for the change of the spring rollers after each display of their curtains; a hook-shaped device adapted to be moved from the lower wheels to the upper and vice-versa; means or tracks on the side walls of the framing to direct the said device in its travels; means on the said device to run upon the said tracks of the side walls; means at one end of the curtains to be caught by the hook-shaped device; means on the said hook shaped device to catch automatically the end of a curtain from the lower and upper wheels and to release it at the end of each travel; an intermittent gear mounted on the said driving shaft; an operating mechanism composed of two groups of gears and sprockets mounted on shafts located over and under the intermittent gear and receiving intermittent motion from the said gear; endless chains controlling the said hook shaped device, one of the said chains operated intermittently by the operating mechanism in a way to give a reciprocating motion to the hook shaped device fastened to the said chains; sprockets on which run the said endless chains; said sprockets mounted on shafts at upper and lower parts of the casing, crossing the entire machine, both chains being thus connected and running in unison when one is actuated, combined with a special disk located on the movable partition, opposite to the intermittent gear and supporting electrical devices connecting bulbs placed in front of the casing, to light the curtains at night, and bulbs placed inside the said casing, with suitable reflectors, to permit the showing, through their lighting, of pictures specially painted, as described, at the back of the curtains; means on the said intermittent gear to intermittently work the said electrical devices and to light up and extinguish alternately the lights outside and inside the casing, the said means and the said devices placed on the gear and on the disk in a way to light up the front bulbs when the hook shaped device begins to move, showing the picture at the front of the curtain during its unrolling and for a while at its resting position and to have the front bulbs extinguished when the inside lights are lighted the said inside lights being extinguished when the hook shaped device moves again the same length of time being thus given to the outside and inside lights during the display of each curtain, substantially as set forth.

In testimony whereof I have signed my name to this specification in the presence of two subscribing witnesses:

AUGUSTE MARIOLLE.

Witnesses:
ARTHUR J. CORBETT,
WALTER CHARLESS.